UNITED STATES PATENT OFFICE.

WILHELM HOLDMANN, OF NEW YORK, N. Y.

IMPROVED METHOD OF SEPARATING FIBERS FROM MULBERRY-TREES.

Specification forming part of Letters Patent No. 80,737, dated August 4, 1868.

*To all whom it may concern:*

Be it known that I, WILHELM HOLDMANN, of the city, county, and State of New York, have invented a new and Improved Method of Producing Silk from Mulberry-Trees; and I do hereby declare that the following is a full, clear, and exact description thereof, which will enable others skilled in the art to make and use the same.

The invention relates to a new method of preparing a good quality of silk directly from mulberry-trees without requiring the aid of silk-worms. Silk can by this method be made as good as from the worm, and at least at half the expense. The preparation can be carried on profitably on a small scale by small farmers, as well as on a large scale by manufacturers. The production is increased from year to year with the growth of the trees. Every spring before the sap commences to rise in the trees the branches grown during the preceding year are cut off. The growth of the tree is not thereby detained; on the contrary, it will from year to year bring forth a larger quantity of new branches if they are always removed the spring after their growth. From the bark of these branches I prepare the silk in the following manner: To more readily detach the bark from the wood, these branches should be kept in hot water or steam for about half an hour. The bark can then be easily detached. This can now be steeped in a not too strong potash lye, wherein it may remain for a few days to have the non-fibrous particles decomposed. These decomposed particles are then removed by washing. The bark, which is now already of fibrous appearance, is now again boiled in a fresh potash lye until all impurities are detached. It is then washed in warm water, and again in cold water. The article now produced is pretty clean and pure silk, although a few impure particles still adhere to it. To completely remove these latter the silk is steeped in an alum solution, which is composed of about four parts of alum to two hundred parts of water. In this bath the silk is boiled until all the impurities are completely dissolved. The alum is crystallized again as soon as the water becomes cold, and can therefore be used over and over. The silk is now again, as previously, washed in warm and then in cold water, and is then spread out upon a suitable clean and dry drying-place. After having become thoroughly dry, the silk is combed by a wire or other comb to bring the fibers parallel, and is now ready for use.

Having thus described my invention, what I claim as new, and desire to secure by Letters Patent, is—

The method herein described of producing silk from mulberry-trees.

WILHELM HOLDMANN.

Witnesses:
    ALEX. F. ROBERTS,
    J. FRASER.